US009808764B2

(12) United States Patent
Oklejas, Jr.

(10) Patent No.: US 9,808,764 B2
(45) Date of Patent: Nov. 7, 2017

(54) REVERSE OSMOSIS SYSTEM WITH CONTROL BASED ON FLOW RATES IN THE PERMEATE AND BRINE STREAMS

(75) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 1169 days.

(21) Appl. No.: 13/348,392

(22) Filed: Jan. 11, 2012

(65) Prior Publication Data

US 2012/0138536 A1 Jun. 7, 2012

Related U.S. Application Data

(62) Division of application No. 11/811,622, filed on Jun. 11, 2007, now Pat. No. 8,128,821.

(Continued)

(51) Int. Cl.
*B01D 61/02* (2006.01)
*B01D 61/06* (2006.01)
(Continued)

(52) U.S. Cl.
CPC ......... *B01D 61/025* (2013.01); *B01D 61/022* (2013.01); *B01D 61/06* (2013.01);
(Continued)

(58) Field of Classification Search
CPC .... B01D 61/025; B01D 61/02; B01D 61/022; B01D 61/12; B01D 61/06; B01D 2317/04;
(Continued)

(56) References Cited

U.S. PATENT DOCUMENTS

| 659,930 A | 10/1900 | Kemble |
| 893,127 A | 7/1908 | Barber |

(Continued)

FOREIGN PATENT DOCUMENTS

| EP | 150836 A1 | 2/2005 |
| GB | 2363741 A | 1/2002 |

(Continued)

OTHER PUBLICATIONS

El-Sayed E et al.: "Performance evaluation of two RO membrane configurations in a MSF/RO hybrid system". Desalination, Elsevier, Amsterdam, NL, vol. 128, No. 3, May 1, 2000 (May 1, 2000), pp. 231-245, XP004204830; ISSN: 0011-9164; p. 232-p. 234; figure 1.

(Continued)

*Primary Examiner* — David C Mellon
*Assistant Examiner* — Liam Royce
(74) *Attorney, Agent, or Firm* — Harness, Dickey & Pierce, PLC

(57) ABSTRACT

A reverse osmosis system includes a membrane chamber having a feed line. The chamber generates a permeate stream and a brine stream from the feed line. A feed pump pressurizes the feed line. A first flow meter generates a first flow signal corresponding to a flow of fluid in the permeate stream. A booster device has a turbine in fluid communication with the brine stream and a pump in fluid communication with the feed line. A motor is coupled to the turbine device and a variable frequency drive is attached to the turbine device operating in response to the first flow signal. A second flow meter generates a second flow signal corresponding to a flow of fluid in the brine stream and a variable size nozzle operates an opening in response to the second flow meter.

21 Claims, 4 Drawing Sheets

Related U.S. Application Data

(60) Provisional application No. 60/813,764, filed on Jun. 14, 2006.

(51) Int. Cl.
*B01D 61/12* (2006.01)
*C02F 1/44* (2006.01)
*C02F 103/08* (2006.01)

(52) U.S. Cl.
CPC .............. *B01D 61/12* (2013.01); *C02F 1/441* (2013.01); *B01D 2313/243* (2013.01); *B01D 2317/04* (2013.01); *C02F 2103/08* (2013.01); *C02F 2209/005* (2013.01); *C02F 2209/40* (2013.01)

(58) Field of Classification Search
CPC .... B01D 2313/243; C02F 1/441; C02F 1/044; C02F 2209/40; C02F 2209/005; C02F 2103/08
USPC ........................................................ 210/637
See application file for complete search history.

(56) References Cited

U.S. PATENT DOCUMENTS

| | | | |
|---|---|---|---|
| 1,022,683 A | 4/1912 | Kienast | |
| 1,024,111 A | 4/1912 | Anderson | |
| 1,066,581 A | 7/1913 | Brown | |
| 2,715,367 A | 8/1955 | Kodet et al. | |
| 2,748,714 A | 6/1956 | Henry | |
| 3,160,108 A | 12/1964 | Sence | |
| 3,563,618 A | 2/1971 | Ivanov | |
| 3,614,259 A | 10/1971 | Neff | |
| 3,664,758 A | 5/1972 | Sato | |
| 3,748,057 A | 7/1973 | Eskeli | |
| 3,828,610 A | 8/1974 | Swearingen | |
| 3,969,804 A | 7/1976 | Macinnes et al. | |
| 3,999,377 A | 12/1976 | Oklejas et al. | |
| 4,028,885 A | 6/1977 | Ganley et al. | |
| 4,029,431 A | 6/1977 | Bachl | |
| 4,187,173 A | 2/1980 | Keefer | |
| 4,230,564 A * | 10/1980 | Keefer ................... | B01D 61/08 210/321.6 |
| 4,243,523 A | 1/1981 | Pelmulder | |
| 4,255,081 A | 3/1981 | Oklejas et al. | |
| 4,288,326 A | 9/1981 | Keefer | |
| 4,353,874 A | 10/1982 | Keller et al. | |
| 4,432,876 A | 2/1984 | Keefer | |
| 4,434,056 A | 2/1984 | Keefer | |
| 4,472,107 A | 9/1984 | Chang et al. | |
| RE32,144 E | 5/1986 | Keefer | |
| 4,632,756 A | 12/1986 | Coplan et al. | |
| 4,702,842 A | 10/1987 | Lapierre | |
| 4,772,385 A * | 9/1988 | Yamada ................ | B01D 61/12 210/103 |
| 4,830,572 A | 5/1989 | Oklejas, Jr. et al. | |
| 4,921,603 A | 5/1990 | Yen | |
| 4,936,997 A | 6/1990 | Taniguchi et al. | |
| 4,956,596 A * | 9/1990 | Ogashi ................... | 318/801 |
| 4,966,708 A | 10/1990 | Oklejas et al. | |
| 4,973,408 A | 11/1990 | Keefer | |
| 4,983,305 A | 1/1991 | Oklejas et al. | |
| 4,997,357 A | 3/1991 | Eirich et al. | |
| 5,020,969 A | 6/1991 | Mase et al. | |
| 5,043,071 A | 8/1991 | Anselme et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,132,015 A | 7/1992 | Down | |
| 5,132,090 A | 7/1992 | Volland | |
| 5,133,639 A | 7/1992 | Gay et al. | |
| 5,154,572 A | 10/1992 | Toyoshima et al. | |
| 5,320,755 A | 6/1994 | Hagqvist et al. | |
| 5,338,151 A | 8/1994 | Kemmner et al. | |
| 5,340,286 A | 8/1994 | Kanigowski | |
| 5,401,395 A | 3/1995 | Hagqvist et al. | |
| 5,482,441 A | 1/1996 | Permar | |
| 5,499,900 A | 3/1996 | Khmara et al. | |
| 5,647,973 A | 7/1997 | Desaulniers | |
| 5,702,229 A | 12/1997 | Moss et al. | |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,007,723 A | 12/1999 | Ikada et al. | |
| 6,017,200 A | 1/2000 | Childs et al. | |
| 6,036,435 A | 3/2000 | Oklejas | |
| 6,110,360 A | 8/2000 | Hart, Jr. | |
| 6,110,375 A | 8/2000 | Bacchus et al. | |
| 6,116,851 A | 9/2000 | Oklejas, Jr. | |
| 6,120,689 A | 9/2000 | Tonelli et al. | |
| 6,139,740 A | 10/2000 | Oklejas | |
| 6,187,200 B1 | 2/2001 | Yamamura et al. | |
| 6,190,556 B1 | 2/2001 | Uhlinger | |
| 6,299,766 B1 | 10/2001 | Permar | |
| 6,309,174 B1 | 10/2001 | Oklejas, Jr. et al. | |
| 6,345,961 B1 | 2/2002 | Oklejas, Jr. | |
| 6,468,431 B1 | 10/2002 | Oklejas, Jr. | |
| 6,508,937 B1 | 1/2003 | Kawashima et al. | |
| 6,589,423 B1 | 7/2003 | Chancellor | |
| 6,609,070 B1 * | 8/2003 | Lueck ............................ | 702/50 |
| 6,709,599 B1 | 3/2004 | Rosenberger et al. | |
| 6,713,028 B1 | 3/2004 | Oklejas, Jr. | |
| 6,797,173 B1 | 9/2004 | Oklejas, Jr. | |
| 6,881,336 B2 | 4/2005 | Johnson | |
| 6,908,546 B2 | 6/2005 | Smith | |
| 6,932,907 B2 | 8/2005 | Haq et al. | |
| 6,936,140 B2 | 8/2005 | Paxton et al. | |
| 7,077,962 B2 | 7/2006 | Pipes | |
| 7,150,830 B1 | 12/2006 | Katsube et al. | |
| 2003/0080058 A1 | 5/2003 | Kimura et al. | |
| 2004/0104157 A1 | 6/2004 | Beeman et al. | |
| 2004/0211729 A1 | 10/2004 | Sunkara et al. | |
| 2006/0157409 A1 | 7/2006 | Hassan | |
| 2006/0157410 A1 | 7/2006 | Hassan | |
| 2006/0226077 A1 | 10/2006 | Stark | |
| 2006/0254981 A1 | 11/2006 | Efraty | |
| 2007/0056907 A1 | 3/2007 | Gordon | |
| 2007/0181473 A1 | 8/2007 | Manth et al. | |
| 2007/0199878 A1 | 8/2007 | Eisberg et al. | |
| 2007/0289904 A1 | 12/2007 | Oklejas | |
| 2007/0295650 A1 | 12/2007 | Yoneda et al. | |
| 2008/0023410 A1 | 1/2008 | Efraty | |
| 2008/0217222 A1 | 9/2008 | Efraty | |

FOREIGN PATENT DOCUMENTS

| | | | |
|---|---|---|---|
| WO | WO 9823361 A1 * | 6/1998 | ............. B01D 61/06 |
| WO | WO02/09855 A | 2/2002 | |
| WO | WO2006/106158 A | 10/2006 | |
| WO | WO2007/146321 A | 12/2007 | |

OTHER PUBLICATIONS

Geisler P et al.: "Reduction of the energy demand for seawater RO with the pressure exchange system PES". Desalination, Elsevier, Amsterdam, NL, vol. 135, No. 1-3, Apr. 20, 2001 (Apr. 20, 2001), pp. 205-210, XP004249642; ISSN: 0011-9164; the whole document.

\* cited by examiner

REVERSE OSMOSIS SYSTEM WITH CONTROL BASED ON FLOW RATES IN THE PERMEATE AND BRINE STREAMS

CROSS-REFERENCE TO RELATED APPLICATIONS

This application is a divisional of U.S. patent application Ser. No. 11/811,622, filed Jun. 11, 2007, which claims the benefit of U.S. Provisional Application No. 60/813,764, filed on Jun. 14, 2006. The disclosure of the above application is incorporated herein by reference.

TECHNICAL FIELD

The present disclosure relates generally to reverse osmosis systems, and, more specifically, to a multi-stage reverse osmosis system having a centralized pumping source.

BACKGROUND

The statements in this section merely provide background information related to the present disclosure and may not constitute prior art.

Reverse osmosis systems are used to provide fresh water from brackish or sea water. A membrane is used that restricts the flow of dissolved solids therethrough.

Referring now to FIG. 1, a reverse osmosis system 10 is illustrated having a membrane array 12 that generates a permeate stream 14 and a brine stream 16 from a feed stream 18. The feed stream 18 typically includes brackish or sea water. A feed pump 20 coupled to a motor 22 pressurizes the feed stream 18 to the required pressure flow which enters the membrane array 12.

The permeate stream 14 is purified fluid flow at a low pressure. The brine stream 16 is a higher pressure stream that contains dissolved materials blocked by the membrane. The pressure of the brine stream 16 is only slightly lower than the feed stream 18. The membrane array 12 requires an exact flow rate for optimal operation. The flow rate provides a specific pressure for optimization. A brine throttle valve 24 may be used to regulate the flow through the membrane array 12. Changes take place due to water temperature, salinity, as well as membrane characteristics, such as fowling. The membrane array 12 may also be operated at off-design conditions on an emergency basis. The feed pumping system is required to meet variable flow and pressure requirements.

In general, a higher feed pressure increases permeate production and, conversely, a reduced feed pressure reduces permeate production. The membrane array 12 is required to maintain a specific recovery which is the ratio of the permeate flow to feed flow. The feed flow or brine flow likewise requires regulation.

Referring now to FIG. 2, a system similar to that in FIG. 1 is illustrated with the addition of a feed throttle valve 30. Medium and large reverse osmosis plants typically include centrifugal-type pumps 20. The pumps have a relatively low cost and good efficiency, but they may generate a fixed pressure differential at a given flow rate and speed of rotation. To change the pressure/flow characteristic, the rate of pump rotation must be changed. One way prior systems were designed was to size the feed pump 20 to generate the highest possible membrane pressure and then use the throttle valve 30 to reduce the excess pressure to meet the membrane pressure requirement. Such a system has a low capital cost advantage but sacrifices energy efficiency since the feed pump generates more pressure and uses more power than is required for a typical operation.

Referring now to FIG. 3, another system for solving the pressure/flow characteristics is to add a variable frequency drive 36 to operate the motor 12 which, in turn, controls the operation of the feed pump 20. Thus, the feed pump 20 is operated at variable speed to match the membrane pressure requirement. The variable frequency drives 36 are expensive with large capacities and consume about three percent of the power that would otherwise have gone to the pump motor.

Referring now to FIG. 4, a system similar to that illustrated in FIG. 1 is illustrated using the same reference numerals. In this embodiment, a booster pump 40 having a pump portion 42 and a turbine portion 44 is used to recover energy from the brine stream 16. The pump portion 42 and the turbine portion 44 are coupled together with a common shaft 46. High pressure from the brine stream passes through the turbine portion 44 which causes the shaft 46 to rotate and drive the pump portion 42. The pump portion 42 raises the feed pressure in the feed stream 18. This increases the energy efficiency of the system. The booster 40 generates a portion of the feed pressure requirement for the membrane array 12 and, thus, the feed pump 20 and motor 22 may be reduced in size since a reduced amount of pressure is required by them.

Referring now to FIG. 5, a basic low-cost scheme for a large reverse osmosis plant 50 is illustrated using reference numerals similar to those of FIG. 1. In this embodiment, three reverse osmosis stages having three membranes 12a, 12b, and 12c are used together with three throttle valves 30a, 30b, and 30c. The three membranes 12a, 12b and 12c generate respective permeate streams 14a, 14b, and 14c. Three brine throttle valves 24a, 24b, and 24c are coupled to the brine output 16a, 16b, and 16c. The feed stream 18 is coupled to a feed manifold 52 which, in turn, is coupled to each of the feed throttle valves 30a-30c. Each throttle valve is used to provide feed fluid to each of the respective membrane 12a-12c. The brine stream 16a-16c passes through the brine throttle valves 24a-24c and into a brine manifold 54. The permeate streams are coupled to a permeate manifold 56.

In a large reverse osmosis plant 50, the objective is to use a feed pump with the largest available capacity to achieve the highest possible efficiency at the lowest capital cost per unit of capacity. The optimal capacity of a membrane array 12 is usually smaller than the pumps. Therefore, a single-feed pump 20 may be used to multiple supply membrane arrays 12. Such a configuration is called centralized feed pumping. Because each of the membranes has a variable pressure requirement, individual control using the throttle valves 30a-30c and 24a-24c may be used. However, using throttle valves wastes energy. Also, the individual membranes themselves may have their own pressure requirements due to the following level of the membranes which may vary over the membrane array.

Referring now to FIG. 6, a similar configuration to that of FIG. 5 is illustrated with the addition of a variable frequency drive used to drive the motor 22 and thus the pump 20. The three membranes 12a, 12b and 12c generate respective permeate streams 14a, 14b, and 14c. The variable frequency drive 60 is used to develop enough pressure at the pump 20 to satisfy the pressure requirements of the membrane arrays with the highest pressure requirement. The centralized pumping is partially offset by the difficulty of customizing the fixed discharge pressure of the feed pump to the variable pressure requirements of the multiple membrane arrays.

Both of the configurations in FIGS. 5 and 6 require individual throttling and, thus, the energy efficiency is limited.

Referring now to FIG. 7, an embodiment from U.S. Application WO2004/065308 is illustrated using the same reference numerals as FIG. 1 for the common components. In this embodiment, a hemi 70 includes a booster 72 having a pump portion 74 coupled to the feed stream 18. The booster 72 also includes a turbine portion 76 coupled to the brine stream 16. A motor 78 is coupled to the common shaft 80 that is used to drive the pump portion 74 and the turbine portion 76. A variable frequency drive 82 may be used to drive the motor 78 in a similar way to that illustrated in FIG. 3. However, in this embodiment, the variable frequency drive 82 controls the motor 78 which turns the common shaft 80 of the pump portion 74 and the turbine portion 76. In this embodiment, a second booster 84 having a second turbine portion 86 and a pump portion 88 may be used together with a motor 90. The turbine portion 86 receives brine fluid through the brine throttle valve 24 which turns the common shaft 92 which generates input pressure through the pump portion 88. The pump portion may be used to generate pressure on fluid received from the reservoir 94. Fluid is returned from the reservoir through the turbine portion 76 and a turbine portion 86. The pump portion 88 acts as a primary feed pump for the system. The pump portion 74 provides a main source of energy recovery for the system. The flow of energy through the feed stream 18 may be changed using the throttle valve 24 to divert some of the brine stream to the turbine portion 86.

SUMMARY

The present disclosure provides a reverse osmosis system that is cost effective by using centralized pumping but is capable of individual control at the various membrane stages.

In one aspect of the disclosure, a reverse osmosis system includes a membrane chamber having a feed line generating a permeate stream and a brine stream. A feed pump pressurizes the feed line. A first flow meter generates a first flow signal corresponding to a flow of fluid in the permeate stream. A booster device has a turbine in fluid communication with the brine stream and a pump in fluid communication with the feed line. A motor is coupled to the turbine device and a variable frequency drive is attached to the turbine device operating in response to the first flow signal. A second flow meter generates a second flow signal corresponding to a flow of fluid in the brine stream and a variable size nozzle operates an opening in response to the second flow meter.

In a further aspect of the disclosure, a method includes pressurizing the feed line, generating a first flow signal corresponding to a flow of fluid in the permeate stream, operating a variable frequency drive in response to the first flow signal, controlling the motor in response to the variable frequency drive, generating a second flow signal corresponding to a flow of fluid in the brine stream, and controlling an opening of a variable size nozzle fluidically coupled to the turbine portion in response to the second flow signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
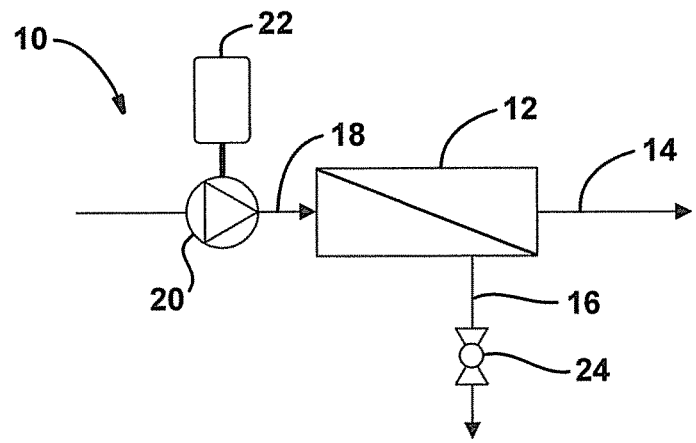
FIG. 1 is a schematic view of a prior reverse osmosis system.
Figure 2:
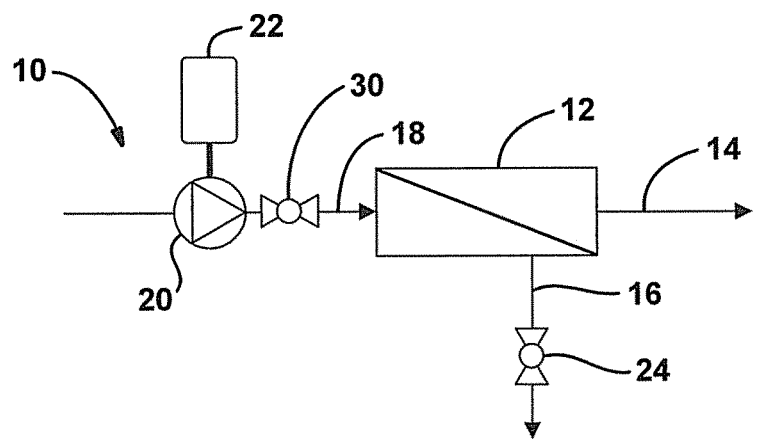
FIG. 2 is a schematic view of an alternate prior art reverse osmosis system.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Figure 8:
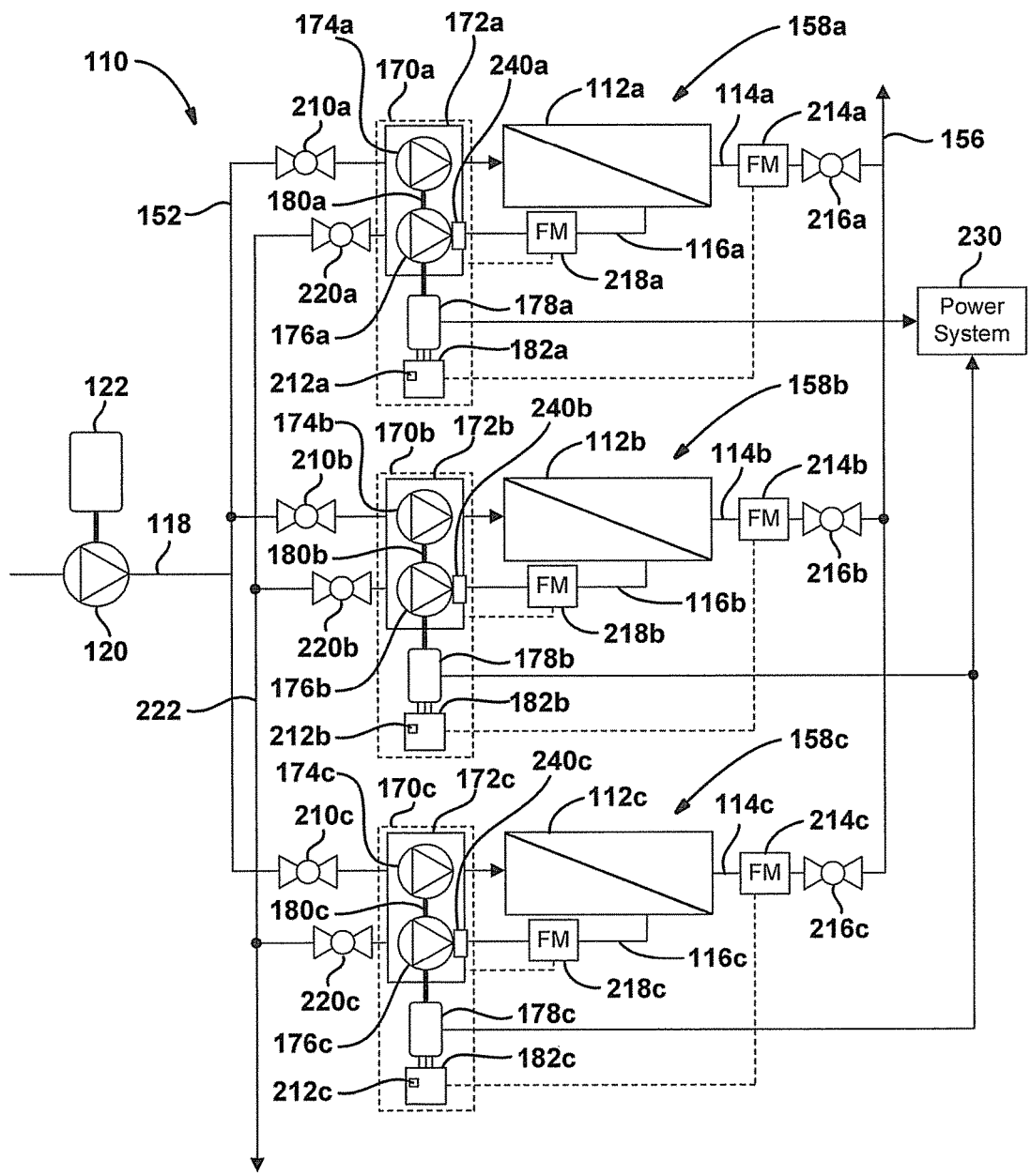
FIG. 8 is a schematic view of a reverse osmosis system according to the present disclosure.

Referring now to FIG. 8, a reverse osmosis system 110 includes a centralized pumping system using pump 120 controlled by motor 122 operates at a fixed speed. Thus, no variable frequency drive is used for the relatively large central pump 120. Also in this embodiment, the use of throttle valves is avoided so that an increase in efficiency of the overall system is achieved. In this embodiment, the feed stream 118 is fluidically coupled to a feed manifold 152. In this embodiment, the feed manifold 152 is used to provide fluid to three reverse osmosis membrane stages 158a-158c and their respective membrane arrays 112a-112c. It should be noted that various numbers of membrane arrays and redundant systems may be coupled to the feed manifold 152. The following description is set forth for stage 158a. The description is equally application to the other stages.

The feed manifold 152 is coupled to respective isolation valves 210a, 210b, 210c, 220a, 220b, 220c, 216a, 216b and 216c. The feed stream is then provided to the hemis 170a, 170b and 170c within the respective first stage 158a, 158b, 158c. More specifically, the feed stream is directed to the pump portion 174a of booster 172a of the hemi 170a, the pump portion 174b of booster 172b of hemi 170b and the pump portion 174c of booster 172c of hemi 170c. The hemis 170a, 170b and 170c also include turbine portions 176a, 176b and 176c coupled together with the respective pump portion 174a, 174b and 174c using a respective common shaft 180a, 180b and 180c. The hemis 170a, 170b and 170c also include a respective motor 178a, 178b and 178c and respective variable frequency drives 182a, 182b and 182c. The variable frequency drives 182a, 182b and 182c may include a respective controller 212a, 212b and 212c. The respective boosters 172a, 172b and 172c raise the feed pressure through pump portion 174a, 174b and 174c. The increased-pressure feed stream 118 enters the respective membrane array 112a, 112b and 112c and generates a respective permanent stream 114a, 114b and 114c and a brine stream 116a, 116b and 116c. The permeate streams 114a, 114b and 114c pass through a flow meter 214a, 214b and 214c and respective isolation valves 216a, 216b and 216c. The flow through the isolation valves 216a, 216b and 216c is coupled to a permeate manifold 156.

The brine stream 116a, 116b, 116c passes through respective flow meters 218a, 218b and 218c to the respective turbine section 176a, 176b, 176c. The turbine portions 176a, 176b and 176c are coupled to a brine isolation valve 220a, 220b and 220c of the reverse osmosis system 110. Each of the isolation valves 220a-220c are coupled to a brine manifold 222.

The hemi 178 increases the feed pressure and the flow level required by the membrane array 112a. Energy recovery is performed with the brine stream 116a through the turbine portion 176a. Substantial portion of the pressure of the feed stream is generated by the combination of the high pressure pump 120 and the pump 174a. Motor 178a provides a brine adjustment to the shaft speed 180. The brine adjustment may take place due to wear of various components in the system and other requirements. The motor speed and, thus, the shaft speed is adjusted or may be adjusted by the variable frequency drive 182a. Because the requirement for adjustment is small, the motor 178a and, thus, the variable frequency drive 182a are sized relatively small, typically five percent, of the rating of the central pump 120.

The motor 178a may also act as a generator. Should the speed of the shaft 180a be too large, the motor 178a may act as a generator and provide power to the power system 230. Power system 230 may represent the power system of the reverse osmosis system 110. The motor may be an induction motor that is capable of acting as a generator or as a motor in combination with a regenerative variable frequency drive. The regenerative variable frequency drive allows the induction motor to act as a generator.

The flow meter signal generated by the flow meter 214a corresponds to the flow in the permeate. The flow meter signal is coupled to the controller 212a which, in turn, will cause the variable frequency drive 182a to increase the speed of the motor 178a and attached shaft 180a resulting in a high-pressure boost in the pump portion 182a. A higher feed pressure will, thus, be provided to the membrane 112a.

It should be noted that the controller 212 may be implemented in various configurations including digital circuitry, analog circuitry, microprocessor-based circuitry, or the like.

A variable area nozzle 240a may be coupled to the turbine portion 176a. The variable area nozzle 240 may change the area of an opening therethrough to increase or decrease the brine flow. The variable area nozzle 240 is electrically coupled to the flow meter 218a. Variable area nozzle 240 controls the area of the opening in response to the flow meter signal. If the brine flow is below a duty point, the flow meter signal 218a will cause the flow area in the nozzle 240 to increase permitting a higher brine flow. Conversely, if the brine flow rate is above the duty point, the flow meter signal will cause the area of the variable nozzle 240 to reduce the brine flow. A comparison may therefore take place. By controlling either or both signals, the permeate flow and the brine flow may be controlled to desirable levels.

Figure 3:
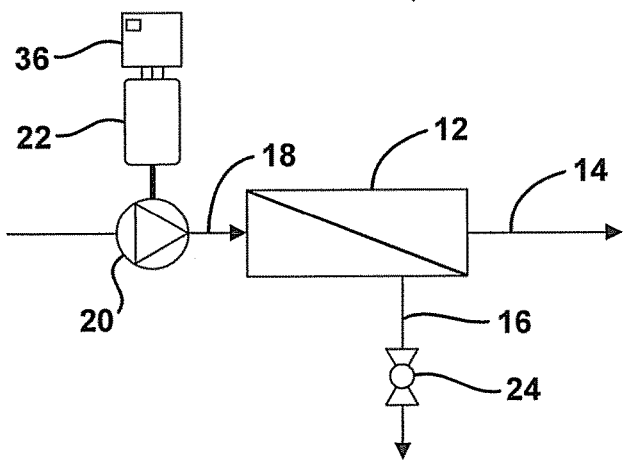
FIG. 3 is a schematic view of another prior art of a reverse osmosis system.
Figure 4:
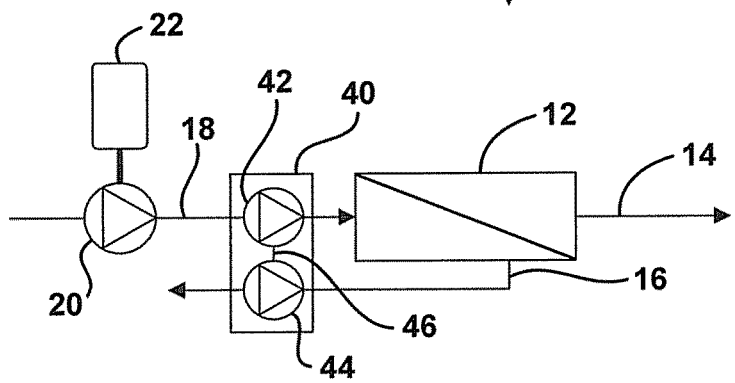
FIG. 4 is another schematic view of a prior art configuration of a reverse osmosis system.
Figure 5:
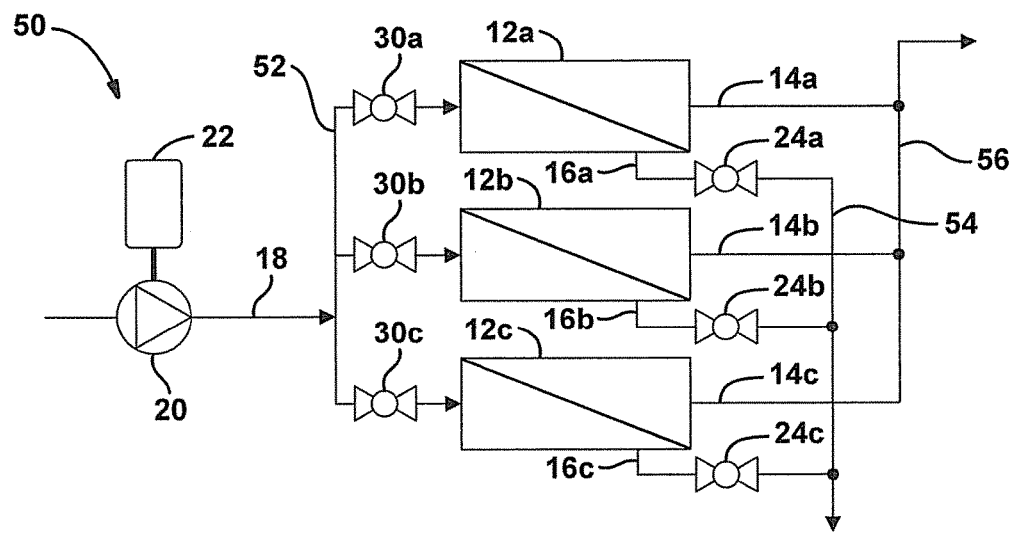
FIG. 5 is another schematic view of a prior art configuration of a reverse osmosis system.
Figure 6:
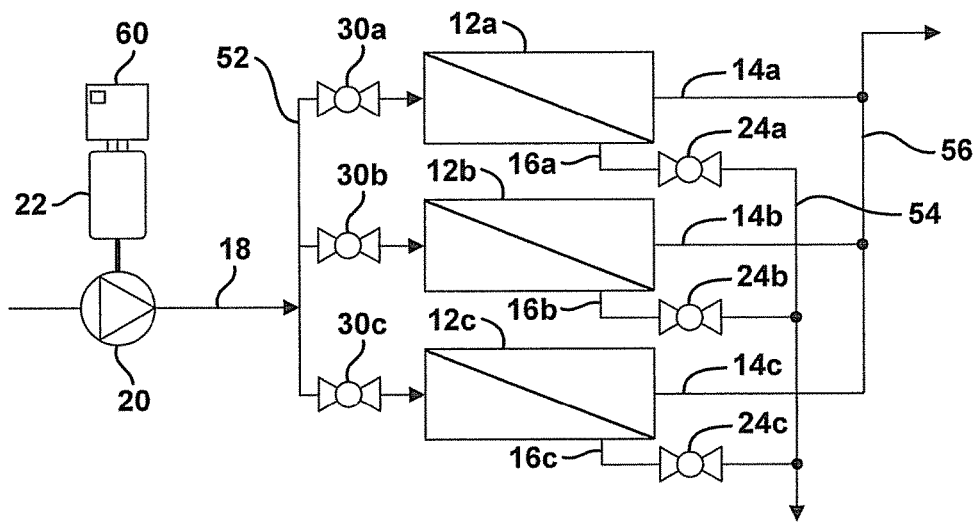
FIG. 6 is another schematic view of a prior art configuration of a reverse osmosis system.
Figure 7:
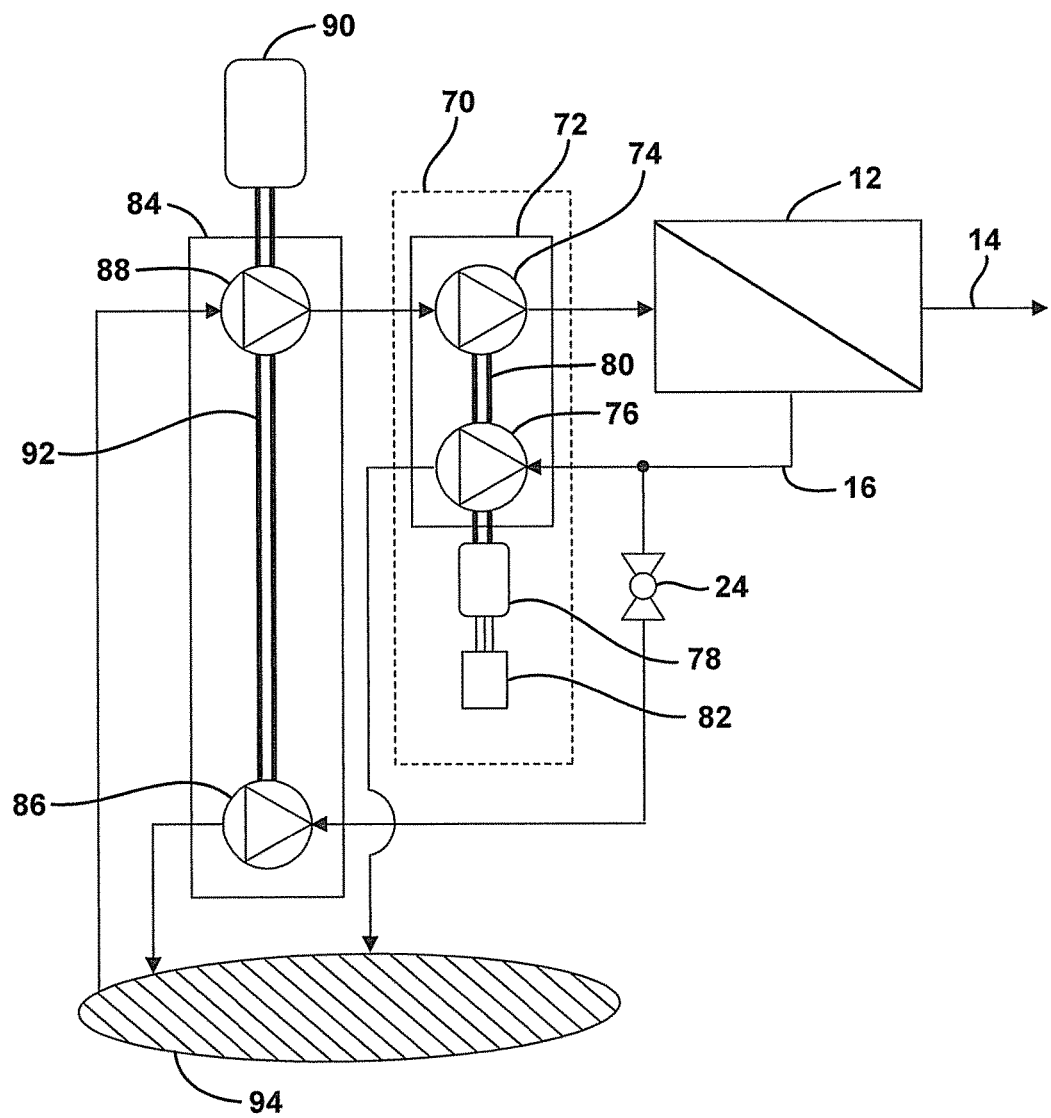
FIG. 7 is another schematic view of a prior art configuration of a reverse osmosis system.

It should be noted that each of the separate sections of FIG. 8 may operate independently. That is, the brine flow and permeate flow for each of the membranes 112 may be independently controlled based on the individual conditions. The variable frequency drive is significantly smaller than that illustrated in FIG. 3 and, thus, is less expensive and more energy efficient for the entire system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a reverse osmosis system, wherein the reverse osmosis system comprises (i) a membrane chamber having a feed line and generating a permeate stream and a brine stream, and (ii) a booster device having a turbine portion in fluid communication with the brine stream, a pump portion in fluid communication with the feed line, and a first motor coupled to the turbine portion using a common shaft between the turbine portion, pump portion, and first motor, the method comprising:
pressurizing the feed line using a feed pump;
generating a first flow signal, via a first flow meter, corresponding to a flow of fluid in the permeate stream;
operating a variable frequency drive attached to the first motor in response to the first flow signal;
controlling the first motor in response to the variable frequency drive;
generating a second flow signal, via a second flow meter, corresponding to a flow of fluid in the brine stream; and
controlling an opening to the turbine portion by adjusting a variable size nozzle in response to the second flow signal.

2. A method as recited in claim 1, wherein controlling the first motor comprises controlling the first motor to act as a generator when the first flow signal is above a control point to generate electrical power for the reverse osmosis system.

3. A method as recited in claim 1, wherein controlling the opening comprises decreasing a size of the opening to decrease a brine flow rate.

4. A method as recited in claim 1, wherein controlling the opening comprises increasing a size of the opening to increase a brine flow rate.

5. A method as recited in claim 1, further comprising providing a first isolation valve disposed between the feed pump and the booster device.

6. A method as recited in claim 5, further comprising providing a second isolation valve disposed between the booster device and a brine manifold.

7. A method as recited in claim 6, further comprising providing a third isolation valve in fluid communication with the permeate stream.

8. A method as recited in claim 1, wherein the first motor is an induction motor.

9. A method as recited in claim 1, wherein the variable frequency drive is a regenerative variable frequency drive.

10. A method of operating a multi-stage reverse osmosis system having a feed manifold, a permeate manifold and a plurality of reverse osmosis stages fluidically coupled to the feed manifold and the permeate manifold, wherein each stage of the multi-stage reverse osmosis system comprises a membrane chamber having a feed line, wherein said membrane chamber generates a permeate stream and a brine stream, wherein each of the stages further comprises (i) a booster device having a turbine portion in fluid communication with the brine stream, a pump portion in fluid communication with the feed line, a variable frequency drive attached to a first motor, said turbine portion, pump portion and first motor comprising a common shaft, the method comprising:
pressurizing a feed stream within the feed manifold with a feed pump to form a pressurized feed stream;
at each of the stages:

passing the pressurized feed stream through the feed line;
generating a first flow signal, in a first flow meter, corresponding to a flow of fluid in the permeate stream;
operating the variable frequency drive of the first motor in response to the first flow signal;
controlling the first motor in response to the variable frequency drive;
generating a second flow signal, via a second flow meter, corresponding to a flow of fluid in the brine stream; and
controlling an opening to the turbine portion by adjusting a variable size nozzle in response to the second flow signal.

11. A method as recited in claim 10, wherein controlling the first motor comprises controlling the first motor to act as a generator when the first flow signal is above a control point to generate power for a reverse osmosis power system from the generator.

12. A method as recited in claim 10, wherein controlling an opening comprises controlling the opening smaller to decrease a brine flow rate.

13. A method as recited in claim 10, wherein controlling an opening comprises controlling the opening larger to increase a brine flow rate.

14. A method as recited in claim 10, further comprising providing a first isolation valve disposed between the feed pump and the booster device for each stage.

15. A method as recited in claim 14, further comprising providing a second isolation valve disposed between the booster device and a brine manifold.

16. A method as recited in claim 15, further comprising providing a third isolation valve in fluid communication with the permeate stream.

17. A method as recited in claim 10, wherein operating the variable frequency drive comprises operating the variable frequency drive for an induction motor.

18. A method as recited in claim 10, wherein operating the variable frequency drive comprises operating a regenerative variable frequency drive for the first motor.

19. A method as recited in claim 1, further comprising:
driving a turbine via the first motor,
wherein
the turbine portion comprises the turbine,
the pressurizing of the feed line is performed via a first pump and includes a second motor driving the first pump, and
the pump portion comprises a second pump; and
driving the second pump via the turbine.

20. A method as recited in claim 1, wherein:
the turbine portion comprises a turbine;
the controlling of the first motor comprises transitioning the first motor to operate as a generator when the first flow signal is above a control point to generate electrical power for the reverse osmosis system; and
the generator is driven by rotation of the turbine.

21. A method as recited in claim 1, wherein:
the turbine portion comprises a turbine; and
the second flow signal indicates an amount of fluid flow provided from the brine stream to the turbine.

* * * * *